(12) United States Patent
Matsuda

(10) Patent No.: US 7,204,332 B2
(45) Date of Patent: Apr. 17, 2007

(54) VEHICLE DRIVING FORCE CONTROL APPARATUS

(75) Inventor: Toshirou Matsuda, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 175 days.

(21) Appl. No.: 10/949,402

(22) Filed: Sep. 27, 2004

(65) Prior Publication Data
US 2005/0104378 A1   May 19, 2005

(30) Foreign Application Priority Data
Nov. 18, 2003 (JP) .............................. 2003-388210

(51) Int. Cl.
*B60K 28/16* (2006.01)
(52) U.S. Cl. ........................................ 180/197; 701/90
(58) Field of Classification Search ...................... None
See application file for complete search history.

(56) References Cited

U.S. PATENT DOCUMENTS

| 4,779,696 | A | * | 10/1988 | Harada et al. | ............... | 180/197 |
|---|---|---|---|---|---|---|
| 4,884,651 | A | * | 12/1989 | Harada et al. | ............... | 180/197 |
| 5,181,175 | A | * | 1/1993 | Shiraishi et al. | ............... | 701/90 |
| 5,400,865 | A | * | 3/1995 | Togai et al. | ................ | 180/197 |
| 5,657,829 | A | * | 8/1997 | May | ............................ | 180/197 |
| 5,735,362 | A | * | 4/1998 | Hrovat et al. | ............... | 180/197 |
| 6,321,865 | B1 | * | 11/2001 | Kuribayashi et al. | ........ | 180/243 |
| 6,615,940 | B2 | * | 9/2003 | Morisawa | ................... | 180/65.1 |
| 7,040,439 | B2 | * | 5/2006 | Kowatari et al. | ........... | 180/197 |

FOREIGN PATENT DOCUMENTS

| EP | 1205329 | A2 | 5/2002 |
|---|---|---|---|
| JP | H04-66338 | A | 3/1992 |
| JP | H07-125561 | | 5/1995 |
| JP | H08-165940 | | 6/1996 |
| JP | H09-175225 | A | 7/1997 |
| JP | 2000-142157 | | 5/2000 |
| JP | 2000-168387 | A | 6/2000 |
| JP | 2000-318473 | A | 11/2000 |
| JP | 2002-218605 | A | 8/2002 |
| JP | 2003-3880 | A | 1/2003 |

* cited by examiner

*Primary Examiner*—Christopher Bottorff
(74) *Attorney, Agent, or Firm*—Global IP Counselors, LLP

(57) ABSTRACT

A vehicle drive force control apparatus configured to make it possible to increase the drive force when the vehicle is accelerating from a stopped condition without increasing the size of its electric generator. In particular, an output of an engine is delivered to the left and right front wheels and to the electric generator. The output voltage of the electric generator is supplied to an electric motor and the output of the electric motor drives the left and right rear wheels. If it is determined that the vehicle is stuck when the vehicle is attempting to accelerate from a stopped condition (starting into motion from a stop), the target slippage amount used for engine TCS control is increased.

17 Claims, 8 Drawing Sheets

VEHICLE DRIVING FORCE CONTROL APPARATUS

BACKGROUND OF THE INVENTION

1. Field of the Invention

The present invention generally relates to a vehicle drive force control apparatus for a vehicle having a wheel or set of wheels driven by a main drive source and an electric generator also driven by the main drive source. Preferably, an electric motor is driven with electric power generated by a generator that is driven by the main drive source. The present invention especially useful in an all wheel drive vehicle in which a pair of main drive wheels are driven by the main drive source, such as an internal combustion engine, and a pair of subordinate drive wheels are driven by the electric motor. Thus, the invention is particularly well-suited for a so-called battery-less four-wheel drive vehicle in which the engine drives the generator and the electric power from the generator is supplied to the electric motor.

2. Background Information

One example of a drive force control apparatus is disclosed in Japanese Laid-Open Patent Publication 2000-318473. The drive force control apparatus of this publication discloses a vehicle in which the front or main drive wheels are driven by an internal combustion engine, and the rear or subordinate drive wheels are driven by an electric motor. The electric motor is driven by electric power generated by an electric generator that is driven by the engine. When the drive force control apparatus disclosed in this publication is used, it is not necessarily mandatory to have a battery that supplies electric power to the electric motor. Furthermore, the device presented in this publication is configured to assist with acceleration from a stopped condition by driving the rear wheels with the electric motor only when the vehicle is starting into motion from a stop.

In view of the above, it will be apparent to those skilled in the art from this disclosure that there exists a need for an improved vehicle drive force control apparatus. This invention addresses this need in the art as well as other needs, which will become apparent to those skilled in the art from this disclosure.

SUMMARY OF THE INVENTION

It has been discovered that in order to keep acceleration slippage of the main drive wheels in check, some four-wheel drive vehicles are provided with a traction control function (also called "engine TCS") that suppresses the output of the engine in such a manner as to adjust the amount of acceleration slippage at the main drive wheels to a target slippage amount.

With such a vehicle, when the traction control function suppresses the increase in rotational speed of the engine in response to acceleration slippage during acceleration from a stopped condition, the result may be that the output current of the electric generator is suppressed to the point that the motor cannot achieve the target motor torque.

Meanwhile, if the traction control function is disabled or if the traction control effect is weakened by simply increasing the target slippage amount on a permanent basis, the steering response during vehicle travel will decline and the turning performance and traveling stability of the vehicle will decrease. Furthermore, in order to provide a traction control function without suppressing the output of the engine, it is necessary to use an electric generator having a large enough capacity to absorb the surplus torque of the main drive wheels.

The present invention was conceived in view of these problems. One object of the present invention is to enable the drive force imparted to the vehicle during acceleration from a stopped condition to be increased without requiring a large electric generator.

In view of the foregoing, a vehicle drive force control apparatus is provided that basically comprising a main drive source, an electric generator, an electric motor, a main drive source output suppressing section, a stuck detecting section and a stuck escaping section. The main drive source is configured and arranged to drive a main drive wheel. The electric generator is configured and arranged to be driven by the main drive source. The electric motor is configured and arranged to drive a subordinate drive wheel from electric power generated by the electric generator. The main drive source output suppressing section is configured to suppress the output of the main drive source such that a degree of acceleration slippage of the main drive wheel is matched to a preset target slippage degree when the main drive wheel undergo acceleration slippage. The stuck detecting section is configured to detect if a vehicle stuck state. The stuck escaping section is configured to conduct at least one of increasing the target slippage degree when a detection result of the stuck detecting section indicates that the vehicle stuck state exists, and stopping the output suppression of the main drive source conducted by the main drive source output suppressing section when the detection result of the stuck detecting section indicates that the vehicle stuck state exists.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
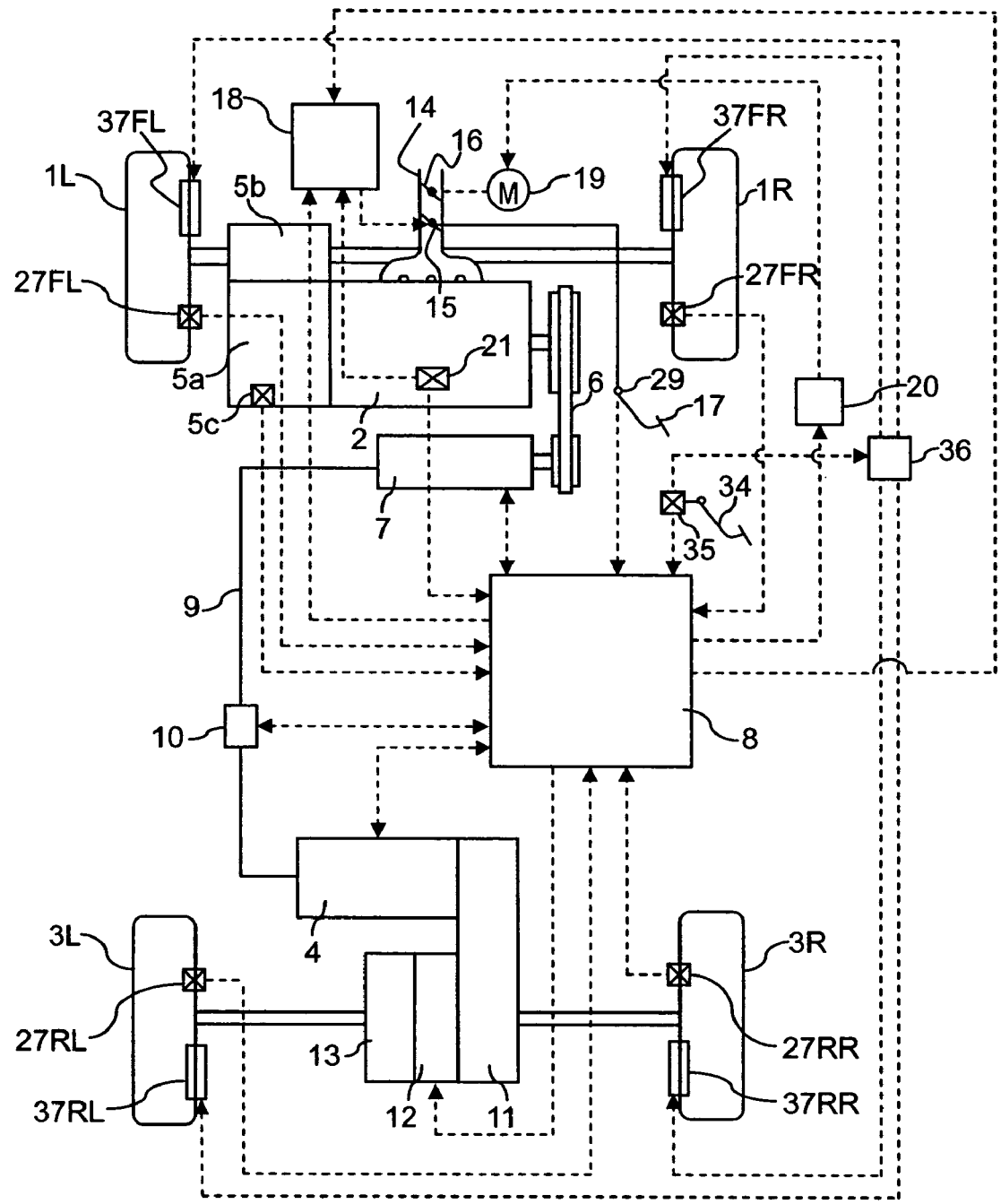
FIG. 1 is a schematic block diagram of a vehicle equipped with a vehicle driving force control apparatus in accordance with preferred embodiments of the present invention.
Figure 2:
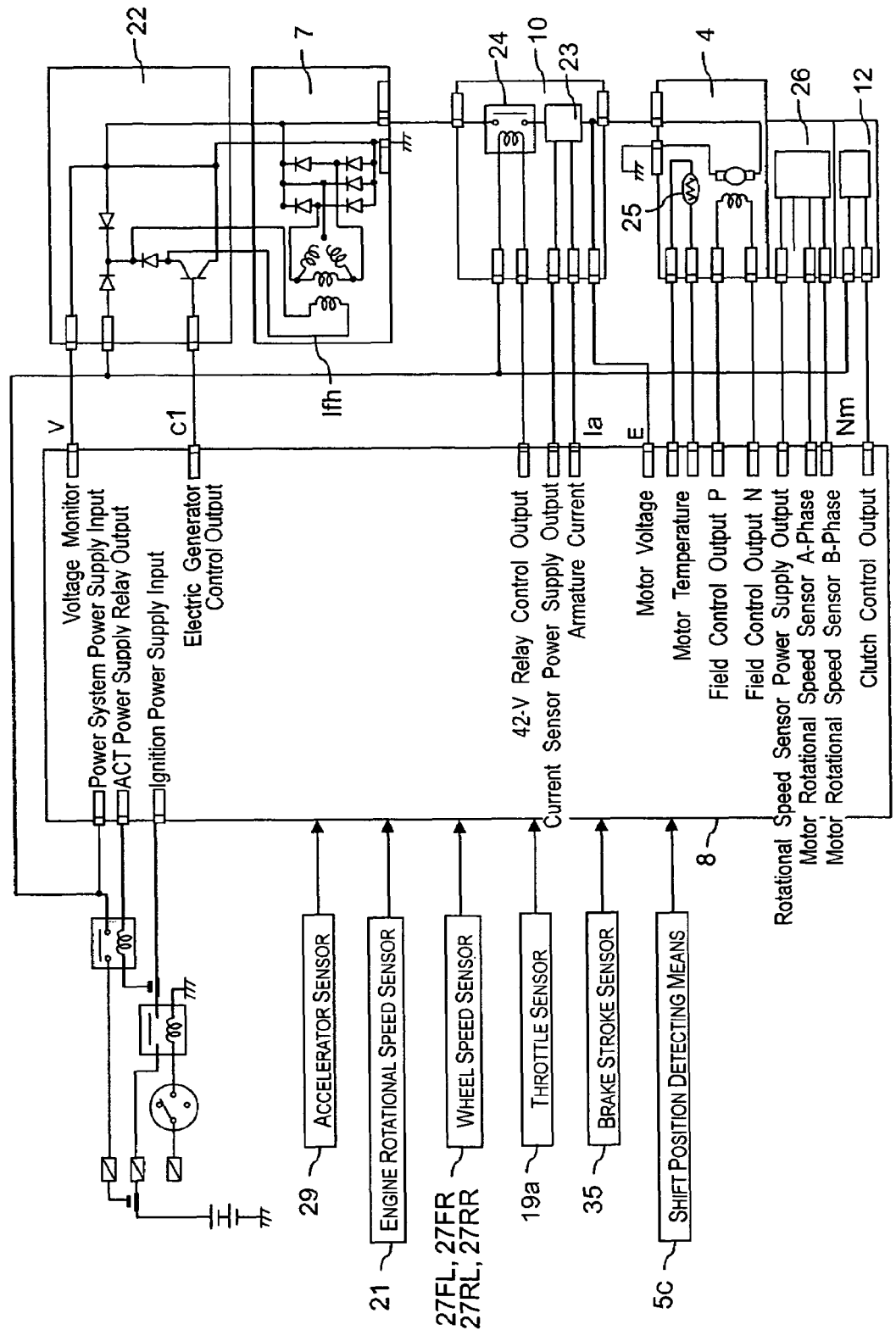
FIG. 2 is a block diagram showing a control system configuration for the vehicle driving force control apparatus illustrated in FIG. 1 in accordance with the illustrated embodiments of the present invention.

Referring initially to FIGS. 1 and 2, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. The output torque Te of the engine 2 is delivered to the left and right front wheels 1L and 1R after passing through a transmission 5a and a differential gear 5b. An endless drive belt 6 transfers power from the internal combustion engine 2 to an electric generator 7, which supplies electrical energy to the electric motor 4. A portion of the output torque Te of the engine 2 is delivered to the electric generator 7 by the endless drive belt 6. In other words, the generator 7 is rotated at a rotational speed Nh, which is obtained by multiplying the rotational speed Ne of the internal combustion engine 2 by the pulley ratio of the endless drive belt 6. Additionally, the rotational speed Nh of the generator 7 can be computed based on the rotational speed Ne of the internal combustion engine 2 and the pulley ratio of the endless drive belt 6.

The transmission 5a is provided with a shift or gear position detecting device 5c (gear ratio detecting device) configured to detect the current shift range or gear position of the transmission 5a. The shift position detecting device 5c sends a signal indicating the detected shift position to a 4WD controller 8. The transmission 5a executes gear shifting in response to a shift command from a transmission control unit (not shown in the drawings). The transmission control unit holds tables or the like containing information describing the shift schedule of the transmission based on the vehicle speed and the accelerator position. When it determines that the vehicle will pass through a shift point based on the current vehicle speed and accelerator position, the transmission control unit issues a shift command to the transmission.

The generator 7 rotates at a rotational speed Nh that is equal to the product of the rotational speed Ne of the internal combustion engine 2 and the pulley ratio of the endless drive belt 6. The load (torque) placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

The internal combustion engine 2 has an air intake passage 14 (e.g., the intake manifold) that includes a main throttle valve 15 and a subordinate throttle valve 16. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The subordinate throttle valve 16 uses a stepper motor 19 as an actuator for adjusting its throttle opening. Specifically, the throttle opening of the subordinate throttle valve 16 is adjusted/controlled by the rotational angle of the stepper motor 19, which corresponds to the step count. The rotational angle of the stepper motor 19 is adjusted/controlled by a drive signal from the motor controller 20. The subordinate throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the subordinate throttle valve 16 so as to be smaller than the throttle opening of the main throttle valve 15.

The vehicle driving force control apparatus is also equipped with an engine rotational speed sensor 21 that detects the rotational speed Ne of the internal combustion engine 2. The engine rotational speed sensor 21 outputs control signals that are indicative of the engine rotational speed Ne to both the engine controller 18 and the 4WD controller 8.

A brake pedal 34 is provided that constitutes a brake instructing/operating section. The stroke amount of the brake pedal 34 is detected by a brake stroke sensor 35, which constitutes a brake operation amount sensor. The brake stroke sensor 35 can be either a sensor that measures the actual stroke amount of the brake pedal 34 or a master cylinder pressure sensor that senses master cylinder pressure which is indicative of the stroke amount of the brake pedal 34. In either case, the brake stroke sensor 35 outputs the brake stroke amount it detects to a brake controller 36 and the 4WD controller 8. The brake stroke sensor 35 can also be configured and arranged to include a brake switch that indicates that the brake pedal 34 has been depressed by a prescribed amount or not. Thus, a brake on signal is sent to the 4WD controller 8 which is indicative of the brake pedal 34 having been depressed by the prescribed amount.

The brake controller 36 controls the braking force acting on the vehicle by controlling the braking devices (e.g., disc brakes) 37FL, 37FR, 37RL and 37RR installed on the wheels 1L, 1R, 3L and 3R in response to the inputted brake stroke amount by the brake pedal 34. In other words, based on the brake pedal depression amount received from the brake stroke sensor 35, the brake controller 36 controls the brake force applied to the wheels 1L, 1R, 3L and 3R by the brake devices 37FL, 37FR, 37RL and 37RR, which are disc brakes or the like. Each of the braking devices 37FL, 37FR, 37RL and 37RR includes a wheel cylinder pressure sensor that is operatively connected to the 4WD controller 8.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value c1 (duty ratio or field current value). In other words, for example, based on the generator control command value c1 (duty ratio) issued from the 4WD controller 8, the voltage regulator 22 controls the field current Ifh of the electric generator 7 and thereby controls the generator load torque Th imposed on the engine 2 by the generator 7 and the output voltage V generated by the generator 7. In short, the voltage adjuster 22 receives the generator control command value c1 (duty ratio or field current value) from the 4WD controller 8 and adjusts the field current Ifh of the generator 7 to a value corresponding to the generator control command value c1. The voltage adjuster 22 is also configured and arranged to detect the output voltage V of the generator 7 and then output the detected voltage value to the 4WD controller 8. This arrangment constitutes the generator output voltage regulating section.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

A control command from the 4WD controller 8 controls the field current Ifm of the electric motor 4 to adjust the drive torque of the electric motor 4 to a target motor torque Tm. In other words, the adjustment of the field current Ifm by the 4WD controller 8 adjusts the drive torque Tm of the electric motor 4 to the target motor torque. A thermistor 25 measures the brush temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The wheels 1L, 1R, 3L and 3R are provided with wheel speed sensors 27FL, 27FR, 27RL, and 27RR, respectively. Each speed sensor 27FL, 27FR, 27RL and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

Figure 3:
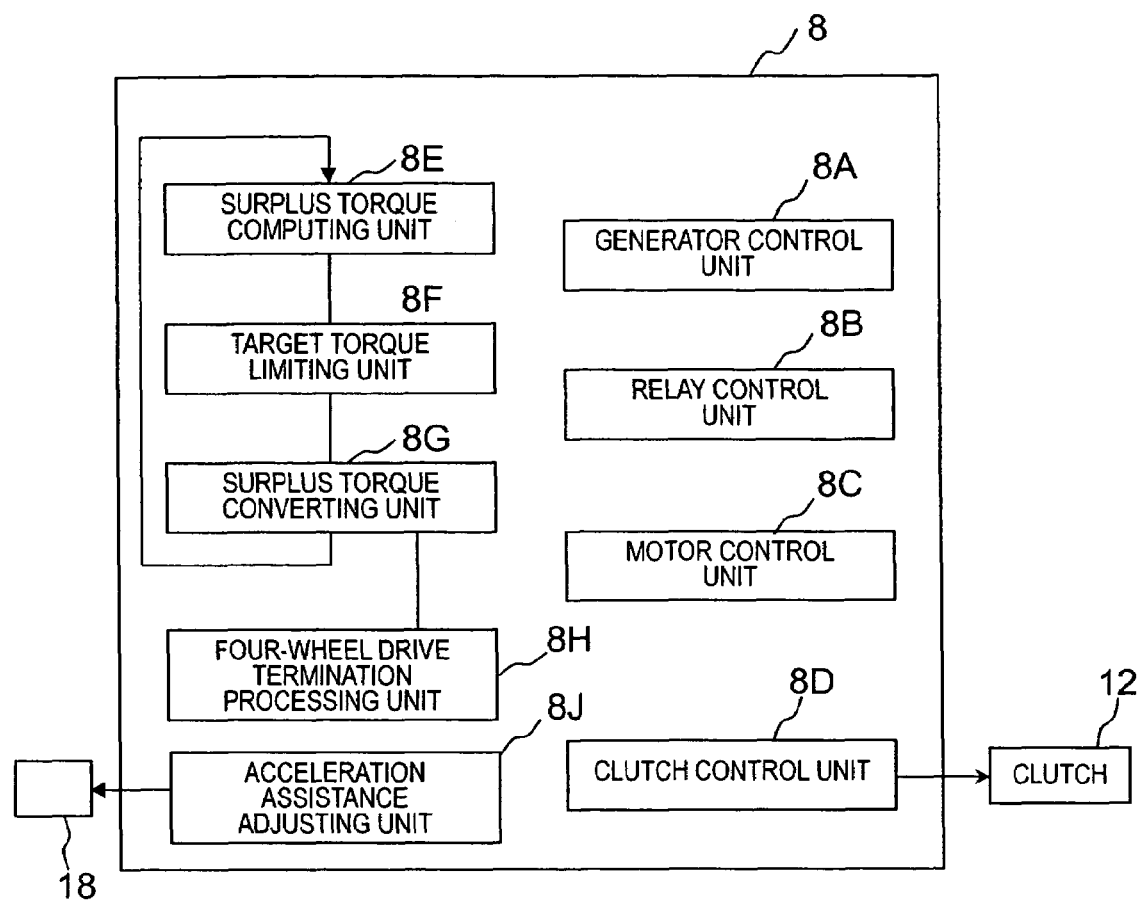
FIG. 3 is a block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control unit or section 8A, a relay control or section 8B, a motor control unit or section 8C, a clutch control unit or section 8D, a surplus torque computing unit or section 8E, a target torque limiting unit or section 8F, a surplus torque converting unit or section 8G, a four-wheel drive termination processing unit or section 8H and an acceleration assistance adjusting unit or section 8J.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

With the 4WD controller 8 of the present invention, as explained in more detail below, a target acceleration slippage degree is increased only when it is determined that the vehicle is stuck and, therefore, that the steering response at that time is not particularly important. This increase in the target acceleration slippage degree enables the rotational speed of the electric generator 7 to increase and, thus, the drive force of the subordinate drive wheels 3L and 3R to increase. As a result, a large drive force can be obtained when a large drive force is necessary for the vehicle to accelerate from a stopped condition (i.e., when the vehicle is stuck) and a large electric generator is not needed.

The generator control section 8A uses the voltage regulator 22 to monitor the output voltage of the electric generator 7. Thus, the generator control section 8A is configured to output the generator control command value c1 of the generator 7 to adjust the field current Ifh in accordance with the generator command value c1. In other words, the generator control section 8A adjusts the field current Ifh of the electric generator 7 in such a manner as to obtain a prescribed output voltage V.

The relay control section 8B controls (connection and disconnection) shutting off and connecting the electric power supplied from the generator 7 to the electric motor 4. In short, it functions to switch the motor 4 between a driven state and a non-driven state.

The monitor control section 8C adjusts the torque of the electric motor 4 to the required prescribed value by adjusting the field current Ifm of the electric motor 4.

The clutch control section 8D controls the state of the clutch 12 by outputting a clutch control command to the clutch 12. In other words, the clutch control section 8D operates the clutch 12 to an engaged (connected) state when the vehicle is determined to be in a four-wheel drive mode.

Based on the input signals, the surplus torque computing section 8E, the target torque limiting section 8F, and the surplus torque converting section 8G execute their respective processing sequences in series (i.e., first 8E, then 8F, then 8G, back to 8E, etc.) in accordance with a prescribed sampling time.

Figure 4:
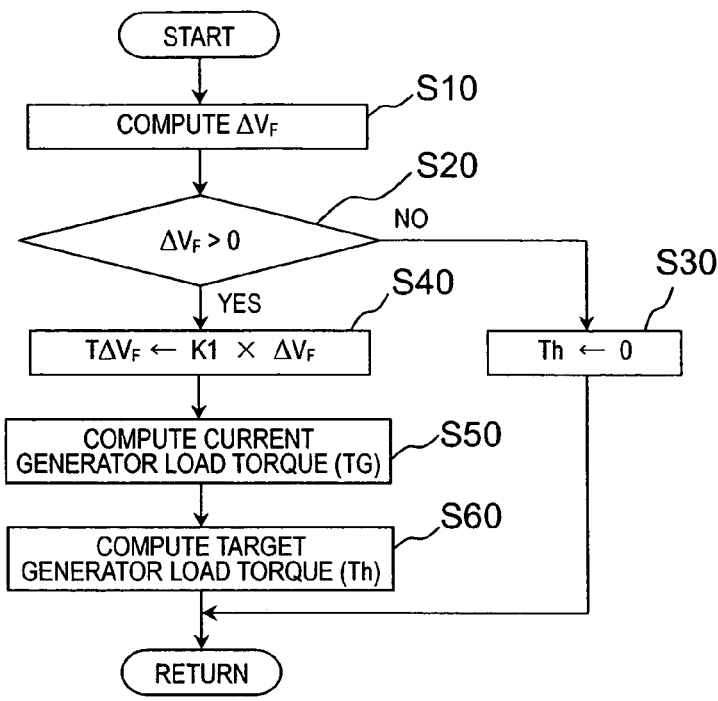
FIG. 4 is a flow chart showing the processing sequence executed by the surplus torque computing section of the 4WD controller for the vehicle driving force control apparatus illustrated in FIG. 1 in accordance with the illustrated embodiments of the present invention.

The processing sequence executed by the surplus torque computing section 8E will now be described with reference to FIG. 4.

First, in step S10, the surplus torque computing section 8E computes the slippage speed or velocity $\Delta V_F$, which is the magnitude of the acceleration slippage of the front wheels 1L and 1R. In particular, the average wheel speeds are computed based on the signals from the wheel speed sensors 27FL, 27FR, 27RL and 27RR. The surplus torque computing section 8E subtracts the average wheel speed of the rear wheels 3L and 3R (subordinate drive wheels) from the wheel speed of the front wheels 1L and 1R (main drive wheels) to find the slippage speed or velocity $\Delta V_F$.

An example of how the slippage velocity $\Delta V_F$ can be computed will now be presented.

First, the average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \quad (1)$$

$$V_{Wr}=(V_{Wrl}+V_{Wrr})/2 \quad (2)$$

Second, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, using the following Equation (3):

$$\Delta V_F = V_{Wf} - V_{Wr} \quad (3)$$

Then, the 4WD controller 8 proceeds to step S20.

In step S20, the surplus torque computing section 8E of the 4WD controller 8 determines whether or not the calculated slippage velocity $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage velocity $\Delta V_F$ is determined to be zero or below, it is estimated that the front wheels 1L and 1R are not experiencing acceleration slippage and the 4WD controller 8 proceeds to step S30, where a target generator load torque Th is set to zero and the surplus torque computing section 8E of the 4WD controller 8 returns to the beginning of the control loop, and the 4WD controller 8 returns to the main program.

Conversely, in step S20 if the slippage velocity $\Delta V_F$ is determined to be larger than zero, then the surplus torque computing section 8E estimates that the front wheels 1L and 1R are experiencing acceleration slippage, and thus, control proceeds to step S40.

In step S40, the surplus torque computing section 8E computes the amount of torque $T\Delta V_F$ that must be absorbed in order to suppress the acceleration slippage of the front wheels 1L and 1R. In other words, the absorption torque $T\Delta V_F$ is an amount that is proportional to the acceleration slippage magnitude. The absorption torque $T\Delta V_F$ is calculated using the following Equation (4):

$$T\Delta V_F = K1 \times \Delta V_F \quad (4)$$

where: K1 is a gain that is found through experimentation or the like.

Then, the surplus torque computing section 8E of the 4WD controller 8 proceeds to step S50.

In step S50, a current load torque TG of the generator 7 is calculated by the surplus torque computing section 8E based on the Equation (5) below, and then the surplus torque computing section 8E proceeds to step S60.

$$TG = K2 \frac{V \times Ia}{K3 \times Nh} \quad (5)$$

where: V: voltage of the generator 7,
Ia: armature current of the generator 7,
Nh: rotational speed of the generator 7,
K3: efficiency, and
K2: coefficient.

In step S60, the surplus torque computing section 8E computes surplus torque, i.e., the target generator load torque Th to be imposed by the electric generator 7. For example, the target generator load torque Th is found based on the Equation (6) stated below, and the surplus torque computing section 8E returns to the beginning of the control loop.

$$Th = TG + T\Delta V_F \quad (6)$$

Figure 5:
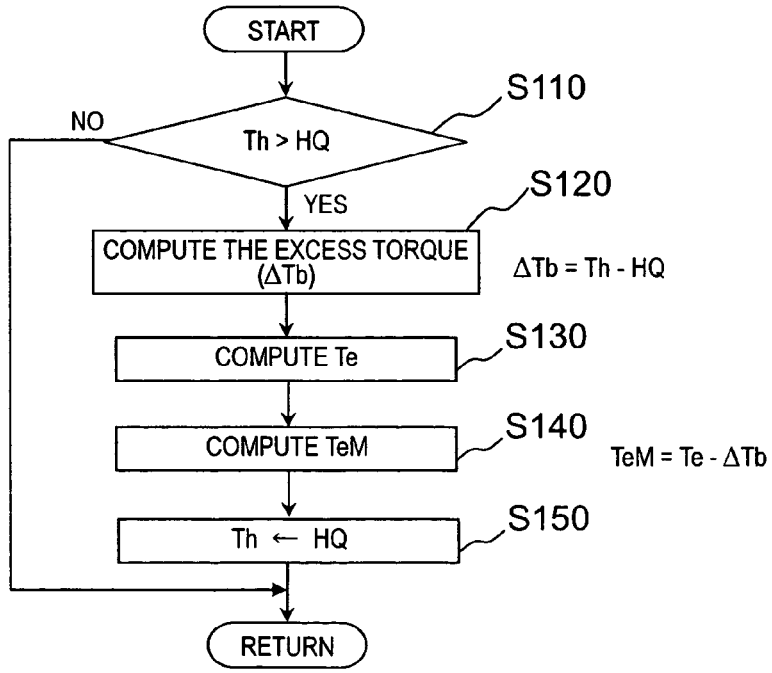
FIG. 5 is a flow chart showing the processing sequence executed by the target torque control (limiting) section of the 4WD controller for the vehicle driving force control apparatus illustrated in FIG. 1 in accordance with the illustrated embodiments of the present invention.

Next, the processing executed by the target torque (control) limiting section 8F will be explained based on FIG. 5. The processing of the target generator load torque Th in the flow chart of FIG. 5 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S110, the target torque limiting section 8F of the 4WD controller 8 determines whether or not the target generator load torque Th is larger than the maximum load capacity HQ of the generator 7. The target torque limiting section 8F proceeds to the beginning of the control program to repeat the processing if the target torque limiting section 8F determines that target generator load torque Th is less than or equal to the maximum load capacity HQ of the generator 7. Conversely, the target torque limiting section 8F proceeds to step S120 if the 4WD controller 8 determines that the target generator load torque Th is larger than the maximum load capacity HQ of the generator 7.

In step S120, the target torque limiting section 8F calculates the excess torque ΔTb, which is the amount by which the target generator load torque Th exceeds the maximum load torque HQ. The excess torque ΔTh can be calcualted according to the following Equation (7):

$$\Delta Th = Th - HQ. \qquad (7)$$

Then, the target torque limiting section 8F proceeds to step S130.

In step S130, the target torque limiting section 8F calculates the current engine torque Te. For example, the current engine torque Te is computed based on the signals from the throttle sensor 19a and the engine rotational speed sensor 21 using an engine torque calculation map. Then, the 4WD controller 8 proceeds to step S140.

In step S140, the target torque limiting section 8F computes the engine torque upper limit value TeM. The engine torque upper limit value TeM is calculated by subtracting the excess torque ΔTb from the engine torque Te, as set forth in the following Equation (8):

$$TeM = Te - \Delta Tb. \qquad (8)$$

After the engine torque upper limit value TeM is outputted to the engine controller 18, the target torque limiting section 8F proceeds to step S150.

In step S150, the target torque limiting section 8F substitutes the maximum load capacity HQ as the target generator load torque Th. In other words, the maximum load capacity HQ is assigned as the target generation load torque Th, and then the target torque limiting section 8F returns to the beginning of the control loop and the 4WD controller 8 returns to the main program.

Figure 6:
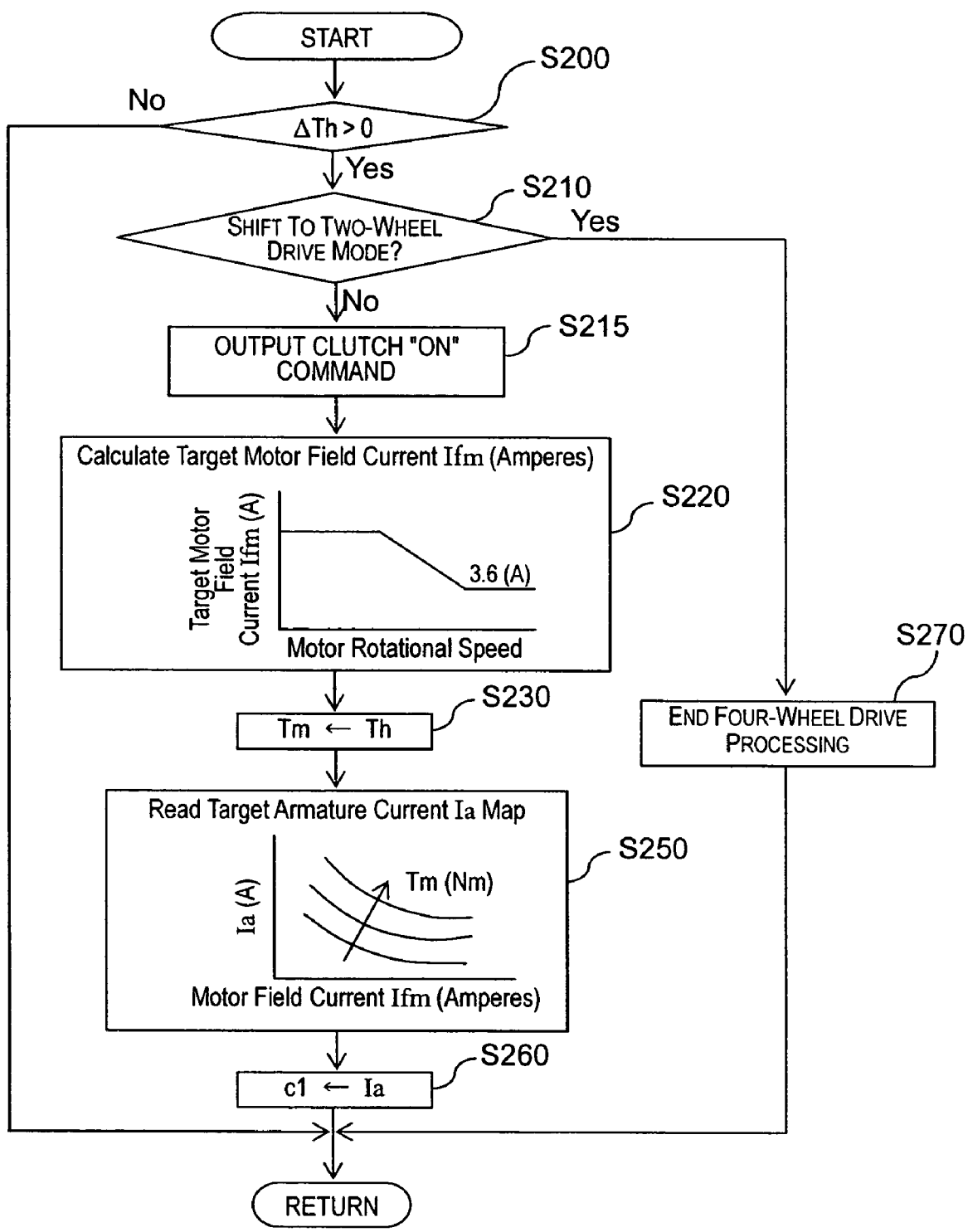
FIG. 6 is a flowchart showing the processing executed by the surplus torque converting section in accordance with the first embodiment of the present invention.

Next, the processing executed by the surplus torque converting section 8G will be explained based on FIG. 6.

In step S200, the surplus torque converting section 8G determines if the target generator load torque Th is larger than 0. If Th is larger than 0, the surplus torque converting section 8G determines that acceleration slippage is occurring at the front wheels 1L, 1R and proceeds to step S210. If Th is equal to or less than 0, the surplus torque converting section 8G determines that the front wheels 1L, 1R are not undergoing acceleration slippage and returns to the beginning of the control sequence leaving the vehicle in a two-wheel drive mode.

First, in step S200, the surplus torque converting section 8G of the 4WD controller 8 determines if the target generator load torque Th is larger than 0. If the target generator load torque Th is determined to be larger than 0, then the program of the surplus torque converting section 8G proceeds to step S210 because the front wheels 1L and 1R are experiencing acceleration slippage. If the surplus torque converting section 8G determines that the target generator load torque Th is less than or equal to 0, then the surplus torque converting section 8G returns to the beginning of the control loop because the front wheels 1L and 1R are not experiencing acceleration slippage. Thus, the vehicle remains in a two-wheel drive mode.

In step S210, the surplus torque converting section 8G determines if the vehicle will shift from four-wheel drive state or mode to two-wheel drive state or mode. If the surplus torque converting section 8G determines that the vehicle will shift to two-wheel drive, then the surplus torque converting section 8G proceeds to step S270 where it executes a four-wheel drive termination processing such as releasing the clutch 12 and stopping the electric generator 7 (c1=0) before returning to the beginning of the control sequence. The surplus torque converting section 8G determines that the vehicle will shift to two-wheel drive in such cases as when the rotational speed of the electric motor 4 has approached an allowable rotational speed limit or when the target motor torque Tm is on a decreasing trend and is found to have become equal to or less than a prescribed threshold value (e.g., 1 N–m) or when the transmission 5a is in a non-drive range (such as Park or Neutral). Meanwhile, the surplus torque converting section 8G proceeds to step S215 for regular processing if no transition to two wheels is being made and the vehicle remains in the four-wheel drive state or mode.

In step S215, the surplus torque converting section 8G issues a clutch ON command to the clutch control section 8D and proceeds to step S220.

In step S220, the surplus torque converting section 8G reads in the rotational speed Nm of the electric motor 4 detected by the motor rotational speed sensor 21. The target motor field current Ifmt corresponding to the rotational speed Nm of the electric motor 4 is calculated. Then the surplus torque converting section 8G sends the calculated target motor field current Ifmt to the motor control section 8C before the surplus torque converting section 8G proceeds to step S230.

The target motor field current Ifmt is held at a fixed current value with respect to the rotational speed Nm of the electric motor 4 so long as the rotational speed Nm is less than a prescribed rotational speed. When the rotational speed Nm exceeds the prescribed rotational speed, the field current Ifmt of the electric motor 4 is reduced using a well-known weak field control method. More specifically, when the rotational speed of the electric motor 4 becomes high, the motor induced voltage E increases and the motor torque declines. Thus, when the rotational speed Nm of the electric motor 4 exceeds a prescribed value, the field current Ifmt of the electric motor 4 is reduced in order to reduce the induced voltage E and thereby increase the current flowing to the motor 4 in order to obtained the required motor torque. As a result, even if the rotational speed of the electric motor 4 becomes high, the required torque can be obtained because the induced voltage E is kept from increasing so that the motor torque is kept from declining. Since the motor field current Ifmt is controlled in two stages, i.e., one field current is used for rotational speeds below a prescribed rotational speed and another field current is used for rotational speeds equal to or above a prescribed rotational speed, the cost of the electronic circuitry can be reduced in comparison with a case in which the field current is controlled on a continuous basis.

It is also acceptable to provide a motor torque correcting device or section that corrects the motor torque on a continuous basis by adjusting the field current Ifm in accordance with the rotational speed Nm of the electric motor 4. In other words, it is acceptable to adjust the field current Ifmt of the electric motor 4 on a continuous basis in accordance with the motor rotational speed Nm instead of on a two-stage basis. Here again, even if the rotational speed of the electric motor 4 becomes high, the required torque can be obtained because the induced voltage E of the electric motor 4 is kept from increasing so that the motor torque is kept from declining. This approach provides a smooth motor torque characteristic and thereby enables the vehicle to travel in a more stable manner than in the case of two-stage control and the motor to be driven in an efficient state at all times.

In step S230, the surplus torque converting section 8G calculates the target motor torque Tm corresponding to the generator load torque Th calculated by the surplus torque computing section 8E using a map or the like and proceeds to step S250.

In step S250, the surplus torque converting section 8G calculates the target armature current Ia corresponding to the target motor torque Tm and the target motor field current Ifm using a map or the like and proceeds to step S260.

In step S260, the surplus torque converting section 8G computes the duty ratio c1 (i.e., the generator control command value) required to achieve the target motor voltage based on the target armature current Ia and outputs the duty ratio c1 before ending the control sequence.

Figure 7:
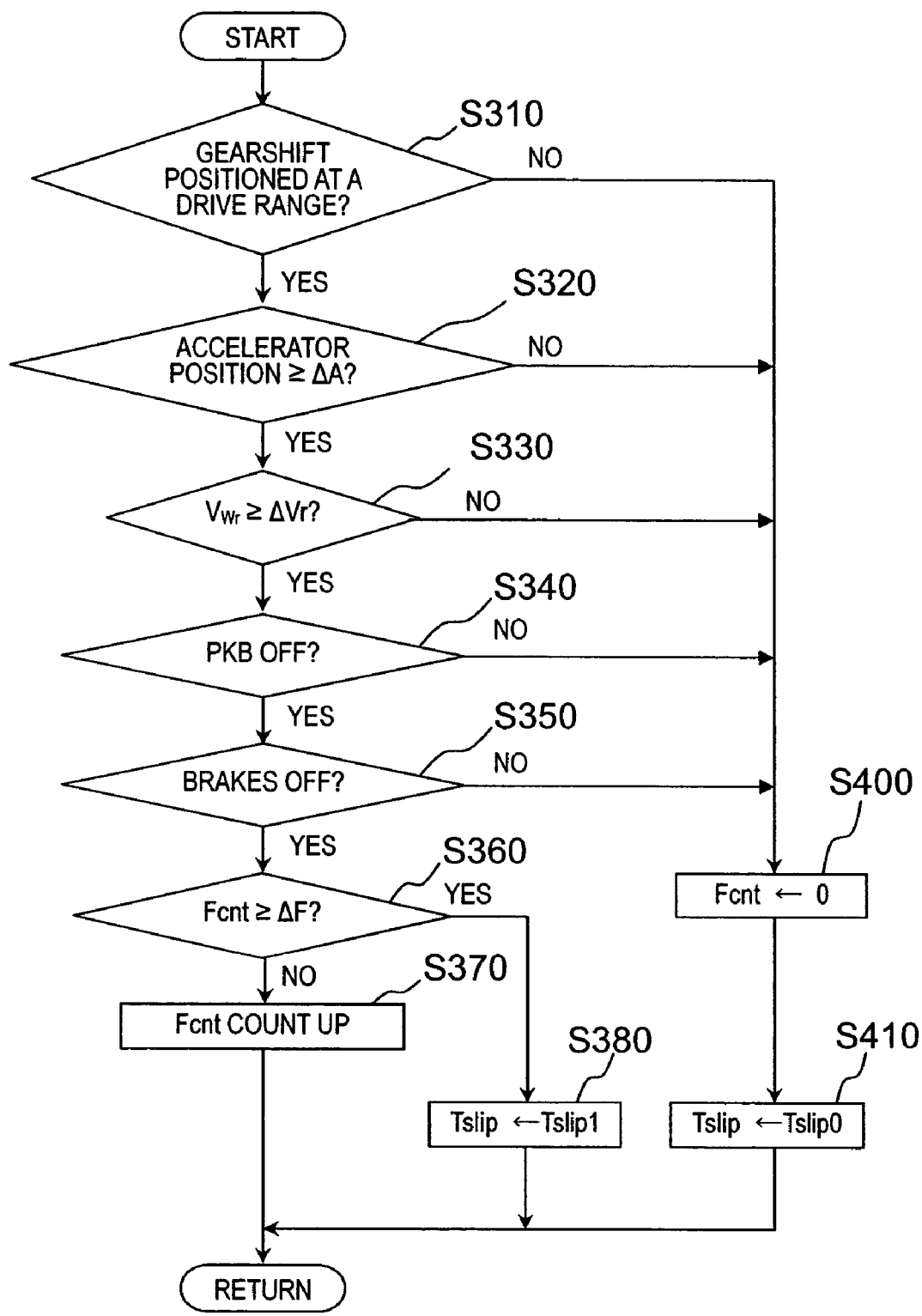
FIG. 7 is a flowchart showing the processing executed by an acceleration assistance adjusting section in accordance with the embodiment of the present invention.

The processing sequence executed by the acceleration assistance adjusting section 8J will now be described with reference to FIG. 7. The acceleration assistance adjusting section 8J executes its processing sequence in accordance with a prescribed sampling time (i.e., each time a prescribed sampling time elapses).

In step S310, the acceleration assistance adjusting section 8J determines if the transmission 5a is in a drive range (i.e., a gear position in which drive power is transferred to a wheel or wheels). If the acceleration assistance adjusting section 8J determines that the transmission 5a is in a drive range, then the acceleration assistance adjusting section 8J proceeds to step S320. If the acceleration assistance adjusting section 8J determines that the transmission 5a is in a non-drive range (such as Park or Neutral), then the acceleration assistance adjusting section 8J proceeds to step S400.

In step S320, if the acceleration assistance adjusting section 8J determines if the accelerator position, which indicates the acceleration request amount, is equal to or larger than a prescribed accelerator position. If the accelerator position is equal to or larger than the prescribed acceleration position, then the acceleration assistance adjusting section 8J proceeds to step S330. If the accelerator position is less than the prescribed accelerator position, then the acceleration assistance adjusting section 8J proceeds to step S400. The prescribed accelerator position is the minimum accelerator position value for which it can be assumed that the driver intends to accelerate the vehicle.

In step S330, the acceleration assistance adjusting section 8J determines if the speed $V_{Wr}$ of the rear wheels 3L and 3R is equal to or less than a prescribed wheel speed. If so, it proceeds to step S340. If the rear wheel speed $V_{Wr}$ is larger than the prescribed wheel speed, the acceleration assistance adjusting section 8J proceeds to step S400. This embodiment illustrates a case in which the vehicle speed is estimated based on the rear wheel speed. The prescribed wheel speed just described is the maximum wheel speed at which it can be assumed that the vehicle is substantially stopped (i.e., actually stopped or moving at an extremely slow speed). For example, the prescribed wheel speed is set to a value between 0.1 and 5 km/h.

In step S340, the acceleration assistance adjusting section 8J determines if the parking brake PBK is OFF. If the parking brake is OFF, then the acceleration assistance adjusting section 8J proceeds to step S350. If the parking brake PBK is ON, then the acceleration assistance adjusting section 8J proceeds to step S400.

In step S350, the acceleration assistance adjusting section 8J determines if the brake is being operated based on, for example, the depression amount of the brake pedal 34. If the brake is not being operated, then the acceleration assistance adjusting section 8J proceeds to step S360. If the brake is being operated, then the acceleration assistance adjusting section 8J proceeds to step S400.

In step S360, the acceleration assistance adjusting section 8J determines if the counter value Fcnt is equal to or larger than a prescribed value ΔF. If the counter value Fcnt is equal to or larger than the prescribed value ΔF, then the acceleration assistance adjusting section 8J proceeds to step S380. If the counter value Fcnt is less than the prescribed value ΔF, the acceleration assistance adjusting section 8J proceeds to step S370.

In step S370, the acceleration assistance adjusting section 8J increases the value of the counter Fcnt by one increment and ends the processing sequence.

In step S380, the acceleration assistance adjusting section 8J sets a value Tslip1 that is larger than a preset reference value as the value of the target slippage amount Tslip and ends the processing sequence. For example, the value Tslip1 is set to 15 km/h.

In step S400, the acceleration assistance adjusting section 8J substitutes 0 (zero) as the value of the counter Fcnt and proceeds to step S410.

In step S410, the acceleration assistance adjusting section 8J substitutes the preset reference value Tslip0 as the value of the target slippage amount Tslip and ends the processing sequence. For example, the preset reference value Tslip0 is set to 8 km/h.

Steps S310 to S350 constitute a stuck detecting device or section and step S380 constitutes a stuck escaping device or section.

Figure 8:
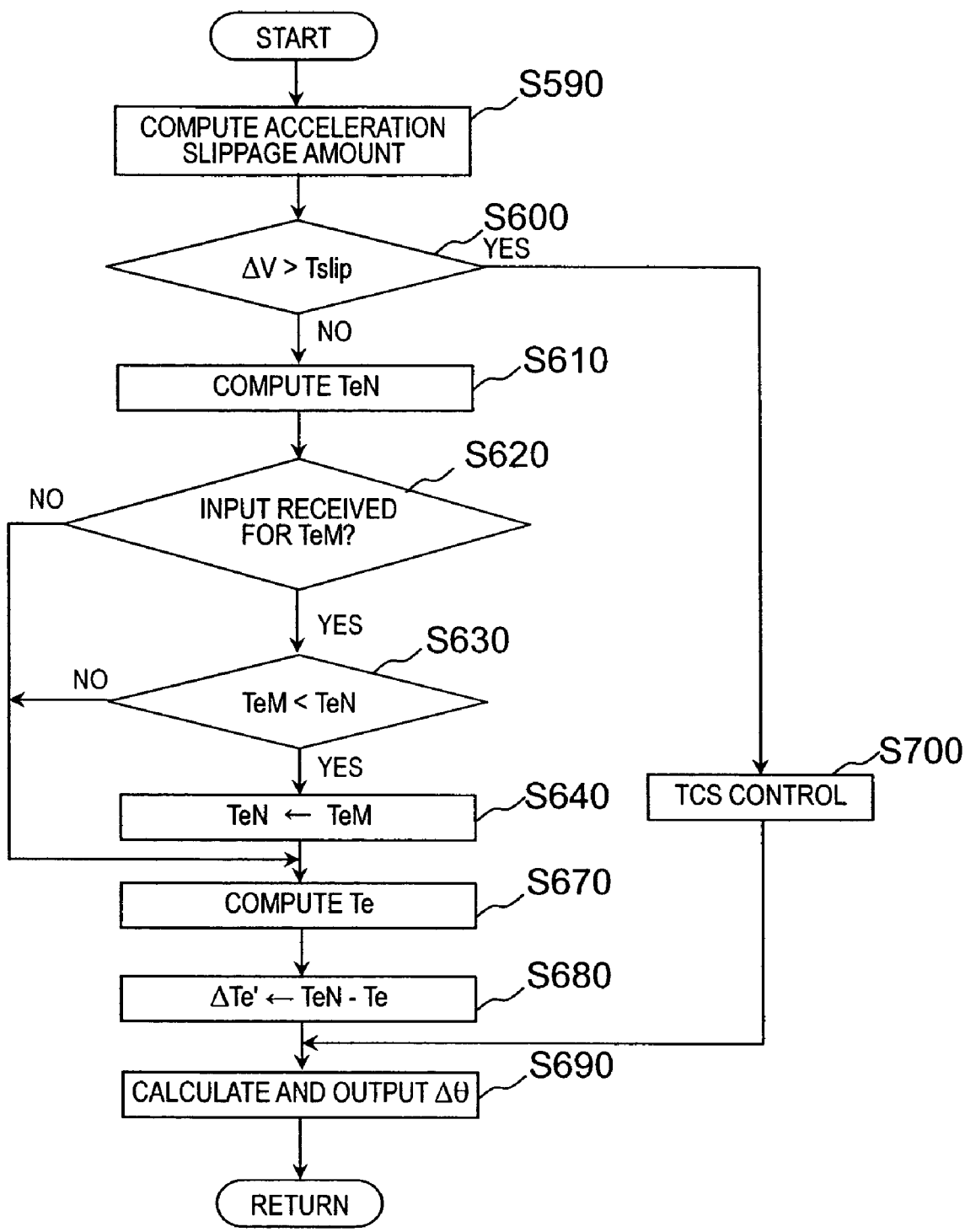
FIG. 8 is a flowchart showing the processing executed by the engine controller in accordance with the first embodiment based on the present invention.

The processing executed by the engine controller 18 will now be described. The engine controller 18 executes the processing shown in FIG. 8 based on the various input signals in accordance with a prescribed sampling time (i.e., once per sampling time period).

In step S590, the engine controller 18 finds the acceleration slippage amount ΔV of the front wheels and proceeds to step S600. In step S600, the engine controller 18 determines if the acceleration slippage amount ΔV exceeds the target slippage amount Tslip. If the acceleration slippage amount ΔV does exceed the target slippage amount Tslip, then the engine controller 18 proceeds to step 700. If the acceleration slippage amount ΔV is equal to or less than the target slippage amount Tslip, then the engine controller 18 proceeds to step S610. The default value of the target slippage amount Tslip is the reference value Tslip0 (<Tslip1).

In step S610, the engine controller 18 computes the target engine output torque TeN requested by the driver based on the detection signal received from the accelerator sensor 29 and proceeds to step S620.

In step S620, the engine controller 18 determines if the engine output torque limit TeM is being received from the 4WD controller 8. If so, the engine controller 18 proceeds to step S630. If not, the engine controller proceeds to step S670.

In step S630, the engine controller 18 determines if the engine output torque limit TeM is smaller than the target engine output torque TeN. If the engine output torque limit TeM is smaller, then the engine controller 18 proceeds to step S640. Meanwhile, if the engine output torque limit TeM is equal to or larger than the target engine output torque TeN, then the engine controller 18 proceeds to step S670.

In step S640, the engine controller 18 limits the target engine output torque TeN by substituting the engine output torque limit TeM for the target engine output torque TeN and proceeds to step S670.

In step S670, the engine controller 18 calculates the current engine output torque Te based on the throttle opening, engine rotational speed, etc., and proceeds to step S680.

In step S680, the engine controller 18 finds the difference ΔTe' between the current output torque and the target output torque TeN. The difference ΔTe' is calculated using the following Equation (9):

$$\Delta Te' = TeN - Te \quad (9)$$

Then, the engine controller 18 proceeds to step S690.

Meanwhile, in step S700, the engine controller 18 executes so-called TCS control to substitute a prescribed TCS torque reduction quantity (>0) for the difference ΔTe'. This step constitutes the main drive source output suppressing device or section.

In step S690, the engine controller 18 calculates the adjustment amount Δθ of the throttle opening θ corresponding to the difference ΔTe' and sends a throttle opening signal corresponding to the throttle opening adjustment amount Δθ to the stepping motor 19 before returning to the beginning of the control sequence.

In the preceding explanation, the engine controller 18 is described as issuing a throttle opening signal Δθ corresponding to the difference ΔTe' in order to simplify the explanation. In actual practice, however, the throttle opening θ is adjusted in successive increments corresponding to a prescribed torque increase amount or torque decrease amount each time step S700 is executed so that the torque and other operating conditions will change smoothly.

The operational effects of the device described heretofore will now be described.

If, while the vehicle is traveling, the torque transmitted to the front wheels 1L and 1R from the engine 2 exceeds the road surface reaction force torque limit, i.e., if the front wheels 1L and 1R (main drive wheels 1L and 1R) undergo acceleration slippage, due to the coefficient of friction μ of the road surface being small or the accelerator pedal 17 being depressed deeply by the driver, the clutch 12 is connected and the electric generator 7 is operated with a load torque Th corresponding to the magnitude of the acceleration slippage, thus shifting the vehicle into four-wheel drive mode. The surplus electric power generated by the electric generator 7 is then used to drive the electric motor 4, which in turn drives the subordinate drive wheels, i.e., the rear wheels 3L and 3R. This driving of the subordinate wheels improves the acceleration performance of the vehicle. Also, since the electric motor 4 is driven using the surplus torque in excess of the road surface reaction torque limit of the main drive wheels 1L and 1R, the energy efficiency and fuel economy of the vehicle are also improved.

Afterwards, the drive torque transmitted to the front wheels 1L and 1R is adjusted so as to approach a value close to the road surface reaction torque limit of the front wheels 1L and 1R and the vehicle is shifted back to two-wheel drive. As a result, acceleration slippage of the front wheels 1L, 1R (main drive wheels 1L and 1R) is suppressed.

Meanwhile, if the acceleration slippage amount ΔV of the front wheels exceeds the target slippage ratio Tslip while the vehicle is traveling, engine TCS control is executed to suppress the output of the engine 2 and control the acceleration slippage of the main drive wheels, i.e., the front wheels 1L and 1R, to the target slippage amount Tslip (=Tslip0) separately from the operation of the electric generator 7.

Additionally, if the front wheels 1L and 1R (main drive wheels 1L and 1R) undergo acceleration slippage when the vehicle is accelerating from a stopped condition, the generator 7 is operated with a generator load torque Th matched to the acceleration slippage amount ΔV and the electric motor 4 is driven with an armature current matched to the acceleration slippage amount ΔV. The motor 4 thereby provides an assisting drive force to assist the acceleration of the vehicle.

In some cases when the vehicle is starting into motion from a stop, the road surface on which the vehicle is stopped has a large resistance to motion of the vehicle due to deep snow, sand, potholes, or slushy snow. If the front wheels 1L and 1R (main drive wheels 1L and 1R) undergo acceleration slippage on such a road surface, the vehicle may become stuck and unable to start into motion. More specifically, if the front wheels 1L, 1R slip to such a degree that the acceleration slippage amount ΔV exceeds the reference target slippage amount Tslip0, engine TCS control is executed and the output of the engine 2 is suppressed such that the acceleration slippage amount ΔV is adjusted to the normal target slippage amount Tslip0 (e.g., 8 km/h). Consequently, the rotational speed of the engine 2 is limited, which means the rotational speed and thus the output of the electric generator 7 is limited, which means the torque of the rear wheels 3L and 3R driven by the motor 4 is limited.

When this limitation occurs, if the vehicle is determined to be substantially stopped (i.e., actually stopped or moving at an extremely slow speed) irregardless of the driver's intent to start into motion (i.e., irregardless of the driver's depression of the accelerator pedal 17, the transmission 5a being in a drive range, and the brake devices not being operated), the vehicle is determined to be stuck and the drive force control apparatus increases the target slippage amount Tslip to Tslip1. In short, by intentionally weakening the effect of the traction control function, the decline in engine rotational speed is checked and the output of the electric generator 7 is increased. As a result, the drive force imparted to the rear wheels 3L and 3R by the electric motor 4 is increased and the drive force available to start the vehicle into motion is increased. After the vehicle starts moving and the vehicle speed reaches a speed equal to or above a prescribed vehicle speed at which it can be assumed that the vehicle has escaped from the stuck condition, the target slippage amount Tslip is lowered to the reference value Tslip0 so that the steering response is returned to normal and the effect of the stuck escaping device or section on the turning performance and traveling stability of the vehicle held in check.

With this embodiment, the decline in steering response resulting from increasing the target slippage amount does not cause a problem because the target slippage amount Tslip is only increased in situations where the vehicle is stuck and substantially stopped (i.e., actually stopped or moving at an extremely slow speed).

Also, with this embodiment, the vehicle is determined to be stuck when the conditions used to determine that the vehicle is stuck and cannot start into motion (i.e., the accelerator pedal depressed to or beyond a position indicating the intent to accelerate, the transmission is in a drive range, the brake devices are not being operated, and the vehicle is substantially stopped) have continued for a prescribed period of time (e.g., 5 seconds). As a result, the drive force control apparatus can reliably detect if indeed the driver wishes to start the vehicle into motion but cannot because the vehicle is stuck.

Figure 9:
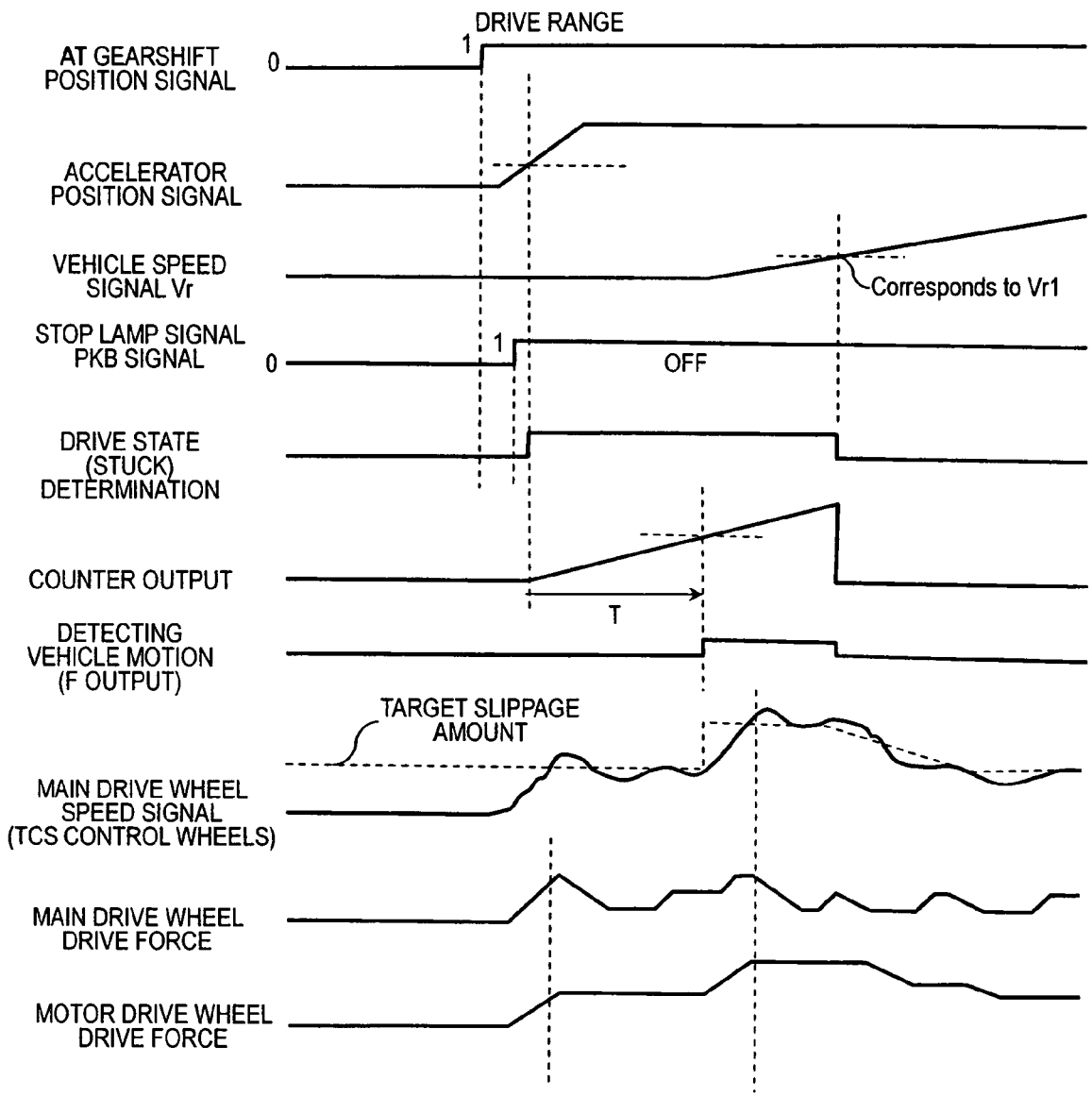
FIG. 9 is a time chart in accordance with the embodiment of the present invention.

FIG. 9 shows a time chart for a case in which the vehicle becomes stuck when attempting to start into motion (accelerate from a stopped condition). As indicated in FIG. 9, first the gearshift position is set to a drive range, the brake pedal is released, and the parking brake is turned OFF (released). The accelerator pedal 17 is then depressed to or beyond a position indicating the intent to accelerate and the engine 2 responds by delivering a drive force to the front wheels 1L and 1R (main drive wheels 1L and 1R). At this point, the drive force control apparatus could determine that the vehicle has successfully started into motion if the vehicle speed reached or exceeded a prescribed speed Vr1. In this example, however, the vehicle speed is less than the prescribed speed Vr1, i.e., the vehicle is substantially stopped, indicating the vehicle is stuck and cannot start into motion. Next, the front wheels wheels 1L and 1R undergo acceleration slippage. When the acceleration slippage amount $\Delta V$ exceeds the target slippage amount Tslip0, the traction control function operates to suppress the output of the engine 2 in such a manner that the acceleration slippage amount $\Delta V$ is adjusted to the target slippage amount Tslip0. As a result, the drive torque imparted to the rear wheels 3L and 3R by the electric motor 4 is suppressed and the drive force available to start the vehicle as a whole into motion is limited. In some cases, the vehicle cannot escape from its stuck condition due to this limitation of the overall drive force.

With this embodiment, however, the target slip amount Tslip is increased if the stuck condition continues for a prescribed period T (e.g., five seconds). The electric motor 4 can then impart a larger drive force to the rear wheels 3L and 3R and the drive force available to start the vehicle as a whole into motion is increased, thereby increasing the possibility that the vehicle can escape from the stuck condition.

When the vehicle speed reaches or exceeds the vehicle speed Vr1, at which the vehicle can no longer be the to be substantially stopped and the vehicle can be assumed to have escaped from the stuck condition, the target slippage amount Tslip is lowered back to the reference target slippage amount Tslip and the vehicle is returned to its original drive control state. As shown in FIG. 9, the target slippage amount Tslip is gradually lowered using a first order control delay or the like so that hunting can be avoided.

In this embodiment, the electric generator 7 is driven so as to generate an amount of electric power corresponding to the acceleration slippage amount $\Delta V$ of the front wheels 1L and 1R. Consequently, as shown in FIG. 9, the drive force imparted to the rear wheels 3L and 3R by the motor 4 varies in such a manner as to generally follow the acceleration slippage amount $\Delta V$ of the front wheels 1L and 1R.

Although in this embodiment the target slippage amount Tslip is set to a predetermined higher target value Tslip1 while the vehicle is determined to be stuck, the invention is not limited to such an arrangement. For example, it is also acceptable to increase the target slippage amount Tslip in accordance with the amount of time the stuck condition has continued or to stop the engine TCS control (i.e., set the target slippage amount Tslip to infinity) while the vehicle is determined to be stuck, thereby increasing the amounted of acceleration slippage that is allowed.

Although the embodiment describes a situation in which the vehicle is shifted into four-wheel drive, i.e., the motor 4 is driven, when the front wheels 1L and 1R undergo acceleration slippage, the invention is not limited to such an arrangement. The invention can also be applied to a system in which the vehicle is shifted into four-wheel drive when the vehicle is starting to move from a stopped condition or when the accelerator pedal is depressed beyond a prescribed position.

Although the embodiment describes a situation in which the engine TCS control is executed based on the target slippage amount, it is also acceptable to execute the TCS control based on the target slippage ratio. In short, so long as it expresses the target slippage degree, it is acceptable to use the slippage amount, slippage ratio, or any other quantity.

It is also acceptable to apply the invention to a system configured such that when the target slippage amount Tslip has been increased but the actual acceleration slippage amount $\Delta V$ does not increase toward the new target slippage amount Tslip, the engine rotational speed is increased irregardless of the accelerator position in order to reliably increase the slippage amount.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-388210. The entire disclosure of Japanese Patent Application No. 2003-388210 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:
1. A vehicle driving force control apparatus comprising:
a main drive source configured and arranged to drive a main drive wheel;
an electric generator configured and arranged to be driven by the main drive source;
an electric motor configured and arranged to drive a subordinate drive wheel from electric power generated by the electric generator;
a main drive source output suppressing section configured to suppress the output of the main drive source such that a degree of acceleration slippage of the main drive wheel is matched to a preset target slippage degree when the main drive wheel undergoes acceleration slippage;
a stuck detecting section configured to detect if a vehicle stuck state exists; and
a stuck escaping section configured to stop the output suppression of the main drive source conducted by the main drive source output suppressing section when the detection result of the stuck detecting section indicates that the vehicle stuck state exists and when the main drive wheel undergoes acceleration slippage.

2. The vehicle drive force control apparatus as recited in claim 1, wherein
the stuck escaping section is configured to increase the target slippage degree when the detection result of the stuck detecting section indicates that the vehicle stuck state exists.

3. The vehicle drive force control apparatus as recited in claim 1, wherein
the stuck escaping section is configured to increase the target slippage degree when a prescribed amount of time has elapsed since determining that the vehicle is attempting to accelerate from a stopped condition.

4. The vehicle drive force control apparatus as recited in claim 2, wherein
the stuck detecting section is configured to determine that the vehicle stuck state exists when an acceleration request is being issued to the main drive source and when the vehicle is stopped or a vehicle speed is such that the vehicle can be assumed to be substantially stopped.

5. The vehicle drive force control apparatus as recited in claim 2, wherein
the electric generator is configured to generate electricity in accordance with an amount of acceleration slippage of the main drive wheel at least when the vehicle is accelerating from a substantially stopped condition.

6. The vehicle drive force control apparatus as recited in claim 4, wherein
the electric generator is configured to generate electricity in accordance with an amount of acceleration slippage of the main drive wheel at least when the vehicle is accelerating from a substantially stopped condition.

7. The vehicle driving force control apparatus as recited in claim 3, wherein
he main drive source is an internal combustion engine.

8. The vehicle driving force control apparatus as recited in claim 3, wherein
the main drive source is further configured to drive a pair of the main drive wheels and the electric motor is further configured to drive a pair of the subordinate drive wheels.

9. The vehicle drive force control apparatus as recited in claim 1, wherein
the stuck detecting section is configured to determine that the vehicle stuck state exists when an acceleration request is being issued to the main drive source and when the vehicle is stopped or a vehicle speed is such that the vehicle can be assumed to be substantially stopped.

10. The vehicle drive force control apparatus as recited in claim 1, wherein
the electric generator is configured to generate electricity in accordance with an amount of acceleration slippage of the main drive wheel at least when the vehicle is accelerating from a substantially stopped condition.

11. The vehicle drive force control apparatus as recited in claim 10, wherein
the electric generator is configured to generate electricity in accordance with an amount of acceleration slippage of the main drive wheel at least when the vehicle is accelerating from a substantially stopped condition.

12. The vehicle driving force control apparatus as recited in claim 1, wherein
the main drive source is an internal combustion engine.

13. The vehicle driving force control apparatus as recited in claim 1, wherein
the main drive source is further configured to drive a pair of the main drive wheels and the electric motor is further configured to drive a pair of the subordinate drive wheels.

14. The vehicle driving force control apparatus as recited in claim 1, wherein
the stuck escaping section is configured to increase the target slippage degree when a prescribed amount of time has elapsed since determining that the vehicle is attempting to accelerate from a stopped condition.

15. A vehicle drive force control apparatus comprising:
main drive means for rotating a main drive wheel;
generator means for generating electric power by rotation of the drive means;
electric motor means for rotating a subordinate drive wheel from output voltage supplied from the generator means;
main drive source output suppressing means for suppressing the output of the main drive means such that a degree of acceleration slippage of the main drive wheel is matched to a preset target slippage degree when the main drive wheel undergoes acceleration slippage;
stuck detecting section means for detecting if a vehicle stuck state exists; and
stuck escaping means for stopping the output suppression of the main drive means conducted by the main drive source output suppressing means when the detection result of the stuck detecting means indicates that the vehicle stuck state exists and when the main drive wheel undergoes acceleration slippage.

16. A method of controlling a vehicle drive force control apparatus comprising:
generating electric power using a generator that is driven by rotation of a main drive source used for rotating a main drive wheel;
supply electric power to an electric motor from the generator for rotating a subordinate drive wheel from output voltage supplied from the generator;
suppressing an output of the main drive source such that a degree of acceleration slippage of the main drive wheel is matched to a preset target slippage degree when the main drive wheel undergoes acceleration slippage;
detecting if a vehicle stuck state exists; and
stopping the output suppression of the main drive source when the detection result indicates that the vehicle stuck state exists and when the main drive wheel undergoes acceleration slippage.

17. A vehicle driving force control apparatus comprising:
a main drive source configured and arranged to drive a main drive wheel;
an electric generator configured and arranged to be driven by the main drive source;
an electric motor configured and arranged to drive a subordinate drive wheel from electric power generated by the electric generator;
a main drive source output suppressing section configured to suppress the output of the main drive source such that a degree of acceleration slippage of the main drive wheel is matched to a preset target slippage degree when the main drive wheel undergoes acceleration slippage;

a stuck detecting section configured to detect if a vehicle stuck state exists, the stuck detecting section being configured to determine the vehicle stuck state does not exist when a brake device is being operated; and a stuck escaping section configured to conduct at least one of increasing the target slippage degree when a detection result of the stuck detecting section indicates that the vehicle stuck state exists, and stopping the output suppression of the main drive source conducted by the main drive source output suppressing section when the detection result of the stuck detecting section indicates that the vehicle stuck state exists.

* * * * *